(12) United States Patent
Kuo et al.

(10) Patent No.: US 12,379,621 B2
(45) Date of Patent: Aug. 5, 2025

(54) BENDABLE DEVICE

(71) Applicant: InnoLux Corporation, Miao-Li County (TW)

(72) Inventors: Cheng-Hsia Kuo, Miao-Li County (TW); Chia-Wei Yen, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 18/543,065

(22) Filed: Dec. 18, 2023

(65) Prior Publication Data

US 2024/0118566 A1    Apr. 11, 2024

Related U.S. Application Data

(63) Continuation of application No. 18/057,896, filed on Nov. 22, 2022, now Pat. No. 11,880,101, which is a continuation of application No. 17/021,061, filed on Sep. 15, 2020, now Pat. No. 11,536,996.

(60) Provisional application No. 62/912,084, filed on Oct. 8, 2019.

(30) Foreign Application Priority Data

Jul. 6, 2020 (CN) .......................... 202010639007.3

(51) Int. Cl.
| | |
|---|---|
| *G02F 1/1333* | (2006.01) |
| *G02F 1/133* | (2006.01) |
| *G02F 1/1335* | (2006.01) |

(52) U.S. Cl.
CPC .. *G02F 1/133308* (2013.01); *G02F 1/133528* (2013.01); *G02F 1/13306* (2013.01); *G02F 2202/22* (2013.01); *G02F 2202/28* (2013.01)

(58) Field of Classification Search
None
See application file for complete search history.

(56) References Cited

U.S. PATENT DOCUMENTS

| | | | |
|---|---|---|---|
| 2013/0070179 A1* | 3/2013 | Kim | G02F 1/133615 445/24 |
| 2015/0131024 A1* | 5/2015 | Sakamoto | G02F 1/1345 349/58 |
| 2018/0143487 A1* | 5/2018 | Chen | G02F 1/133512 |
| 2018/0341148 A1* | 11/2018 | Takehara | G02F 1/13452 |

FOREIGN PATENT DOCUMENTS

JP    H0922022 A  *  7/1995

* cited by examiner

*Primary Examiner* — Phu Vu
(74) *Attorney, Agent, or Firm* — McClure, Qualey & Rodack, LLP

(57) ABSTRACT

A bendable device is provided. The bendable device includes: a frame, a light shielding layer, a flexible substrate, a flexible film, and a first adhesive material. The light shielding layer is disposed on the frame. The flexible substrate is disposed on the frame and includes a plurality of transistors. The flexible film is connected to the flexible substrate and includes a conductive layer. The first adhesive material connects at least a portion of the flexible film and at least a portion of the flexible substrate.

8 Claims, 4 Drawing Sheets

BENDABLE DEVICE

CROSS REFERENCE TO RELATED APPLICATIONS

This application is a Continuation of pending U.S. patent application Ser. No. 18/057,896, filed Nov. 22, 2022 and entitled "DISPLAY DEVICE", which is a Continuation of U.S. patent application Ser. No. 17/021,061, filed Sep. 15, 2020 and entitled "DISPLAY DEVICE" (now U.S. Pat. No. 11,536,996, issued Dec. 27, 2022), which claims the benefit of U.S. Provisional Application No. 62/912,084, filed Oct. 8, 2019, and claims priority of China Patent Application No. 202010639007.3 filed on Jul. 6, 2020, the entirety of which is incorporated by reference herein.

BACKGROUND

Field of the Invention

The present disclosure relates to a display device, and in particular to a display device with a chamfered structure formed on the edges of a substrate.

Description of the Related Art

Side frames are usually disposed in existing display devices for encasing interior display panels, so as to achieve good protection. However, consumer requirements on the appearance of display devices has been increasing, and oversized side frames have not been favorable for consumers. In addition, when an electrostatic discharge (ESD) test is conducted on a display device, failure may occur if the external electrostatic charge is not grounded successfully. Therefore, how to solve the above problem has become an important issue.

BRIEF SUMMARY

Some embodiments of the disclosure provide a bendable device, including: a frame, a light shielding layer, a flexible substrate, a flexible film, and a first adhesive material. The light shielding layer is disposed on the frame. The flexible substrate is disposed on the frame and includes a plurality of transistors. The flexible film is connected to the flexible substrate and includes a conductive layer. The first adhesive material connects at least a portion of the flexible film and at least a portion of the flexible substrate.

A detailed description is given in the following embodiments with reference to the accompanying drawings.

BRIEF DESCRIPTION OF THE DRAWINGS

The present disclosure can be more fully understood by reading the subsequent detailed description and examples with references made to the accompanying drawings, wherein.

DETAILED DESCRIPTION OF THE INVENTION

Figure 1:
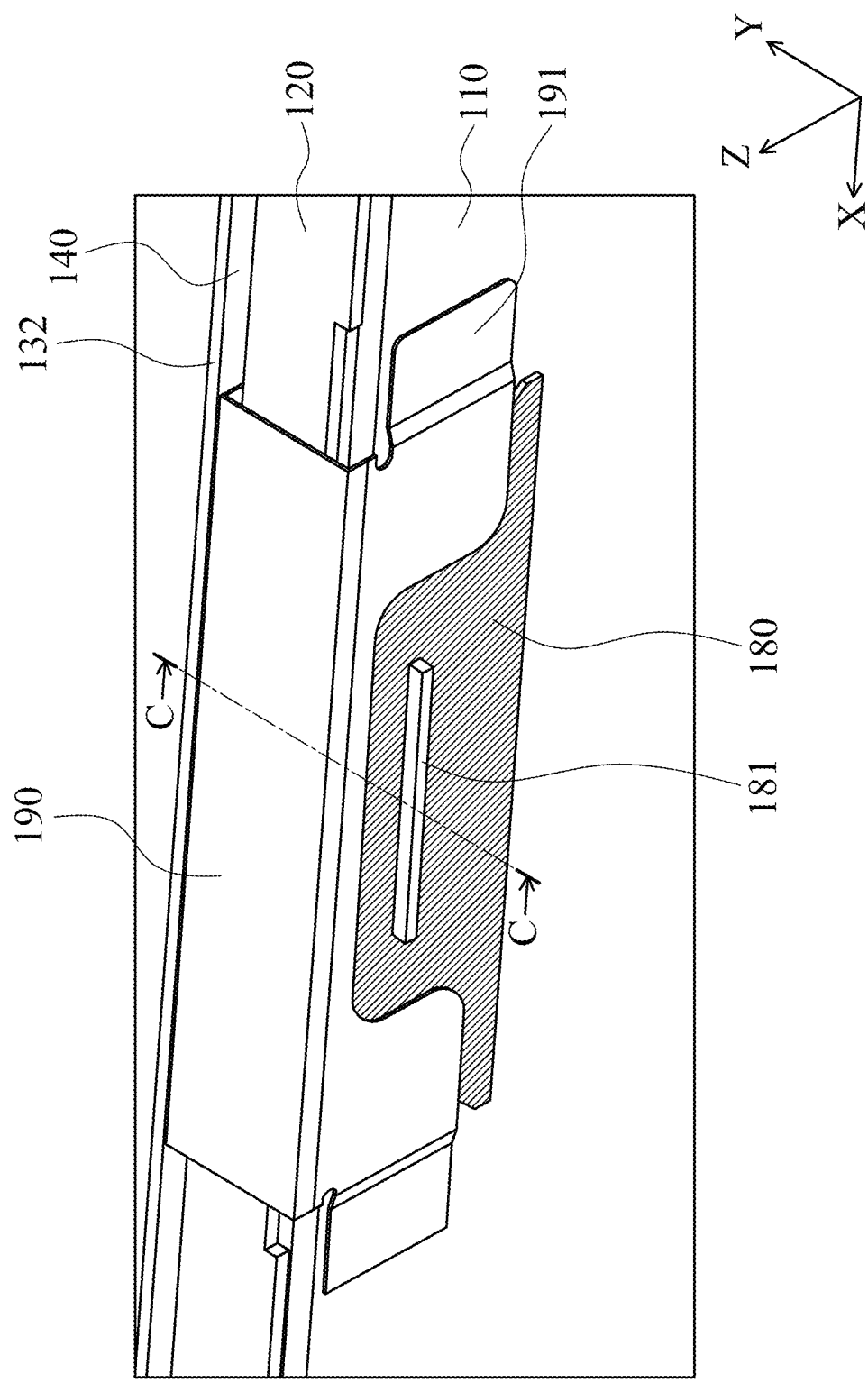
FIG. 1 is a partial stereogram view illustrating a display device in accordance with some embodiments of the present disclosure.

The display devices of some embodiments of the present disclosure are described in the following description. The specific embodiments disclosed are provided merely to clearly describe the usage of the present disclosure by some specific methods without limiting the scope of the present disclosure.

The present disclosure may be understood referring to the following description and the appended drawings. It is noted that for the sake of the comprehensibility and the simplicity of the drawings for the readers, only a portion of the electronic device is illustrated in multiple figures in the present disclosure, and the specific component in the figures are not drawn to scale. In addition, the number and size of each component in the drawings merely serve as an example, but are not intended to limit the scope of the present disclosure.

Certain terms may be used throughout the present disclosure and the appended claims to refer to particular elements. Those skilled in the art will understand that electronic device manufacturers may refer to the same components by different names. The present specification is not intended to distinguish between components that have the same function but different names. In the following specification and claims, the words "including", "comprising", "having" and the like are open words, so they should be interpreted as meaning "including but not limited to . . . ". Therefore, when terms "including", "comprising", and/or "having" are used in the description of the disclosure, the presence of corresponding features, regions, steps, operations and/or components is specified without excluding the presence of one or more other features, regions, steps, operations and/or components.

In addition, in this specification, relative expressions may be used. For example, "lower", "bottom", "higher" or "top" are used to describe the position of one element relative to another. It should be noted that if a device is flipped upside down, an element that is "lower" will become an element that is "higher".

When a corresponding component (such as a film layer or region) is referred to as "on another component", it may be directly on another component, or there may be other components in between. On the other hand, when a component is called "directly on another component", there is no component between the former two. In addition, when a component is called "on another component", the two components have an up-down relationship in the top view, and this component can be above or below the other component, and this up-down relationship depends on the orientation of the device.

The terms "about" or "substantially" are generally interpreted as within 20% of a given value or range, or as interpreted as within 10%, 5%, 3%, 2%, 1%, or 0.5% of a given value or range. The given value is an approximate value. That is, even if the terms "about" or "substantially" are not recited, the description having still implies the meaning of the terms "about" or "substantially."

It should be understood that, although the terms "first", "second" etc. may be used herein to describe various elements, regions, layers and/or portions, and these elements, regions, layers, and/or portions should not be limited by these terms. These terms are only used to distinguish one element, component, region, layer, or portion. Thus, a first element, component, region, layer or portion discussed below could be termed a second element, component, region, layer or portion without departing from the teachings of some embodiments of the present disclosure.

It should be appreciated that when a component or a layer is called "connected to" another component or layer, it may be directly connected to another component, or there may be other inserted components in between. When a component is called "directly connected to another component", there is no inserted component between the former two. In addition, when a component is called "coupled to another component (or its variants)", it may be directly connected to another component, or indirectly connected (such as electrically connected) to another component via one or more component. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

Unless defined otherwise, all terms (including technical and scientific terms) used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined in the present disclosure. In addition, the term "substrate" may include elements already formed thereon or various films or wirings covering the substrate. For example, some required active components (such as transistors) may be disposed on the substrate. However, in order to simplify the drawings, the substrate is illustrated as a flat substrate. It should be appreciated that in the embodiments listed as follows, other embodiments may be accomplished by substituting, replacing, or combining features in several embodiments without departing from the teaching of the present disclosure.

FIG. 1 is a partial stereogram view illustrating a display device 100 in accordance with some embodiments of the present disclosure. It should be noted that the electronic device in the present disclosure may include a display device, an antenna device (such as a liquid-crystal antenna), a sensing device, a touch display, a curved display, or a free shape display, but is not limited thereto. The electronic device may be a bendable or flexible electronic device. The electronic device may include, for example, a liquid-crystal, light-emitting diode, fluorescence, phosphor, or other suitable display materials, or a combination thereof, but it is not limited thereto. The light-emitting diode may include, for example, an organic light-emitting diode (OLED), a mini LED, a micro LED or quantum dot (QD) light-emitting diode (such as including QLED, QDLED), or other suitable materials, and the materials can be arranged and combined arbitrarily, but the present disclosure is not limited thereto. The display device may include a tiled display device, but it is not limited thereto. The electronic device may be an arbitrary combination of the above-mentioned devices, but it is not limited thereto. In addition, the appearance of the electronic device may be rectangular, circular, polygonal, a shape with curved edges, or any other suitable shape. The electronic device may have a peripheral system, such as a driving system, a control system, a light source system, a rack system, etc. to support the display device, the antenna device, or the tiled device. In the following description, the display device is taken as an example to discuss the present disclosure.

As shown in FIG. 1, the display device 100 includes a metal element 110, a frame 120 disposed on the metal element 110, a first substrate 140 disposed on the frame 120, and a flexible film 180 having a driving chip 181. The driver chip 181 may be configured to control the operation of the display device 100. In addition, the display device 100 also includes a conductive structure 190 that is configured to be electrically connected to the metal element 110. In some embodiments, the conductive structure 190 and the metal element 110 may serve as a ground path of the display device 100, so the conductive structure 190 is not electrically connected to the driving chip 181 of the flexible film 180. In the present embodiment, the conductive structure 190 does not contact the driving chip 181. As such, the probability of failure of the display device 100 may be reduced. The complete structure of the display device 100 will be further described below in accompany with FIG. 2.

Figure 2:
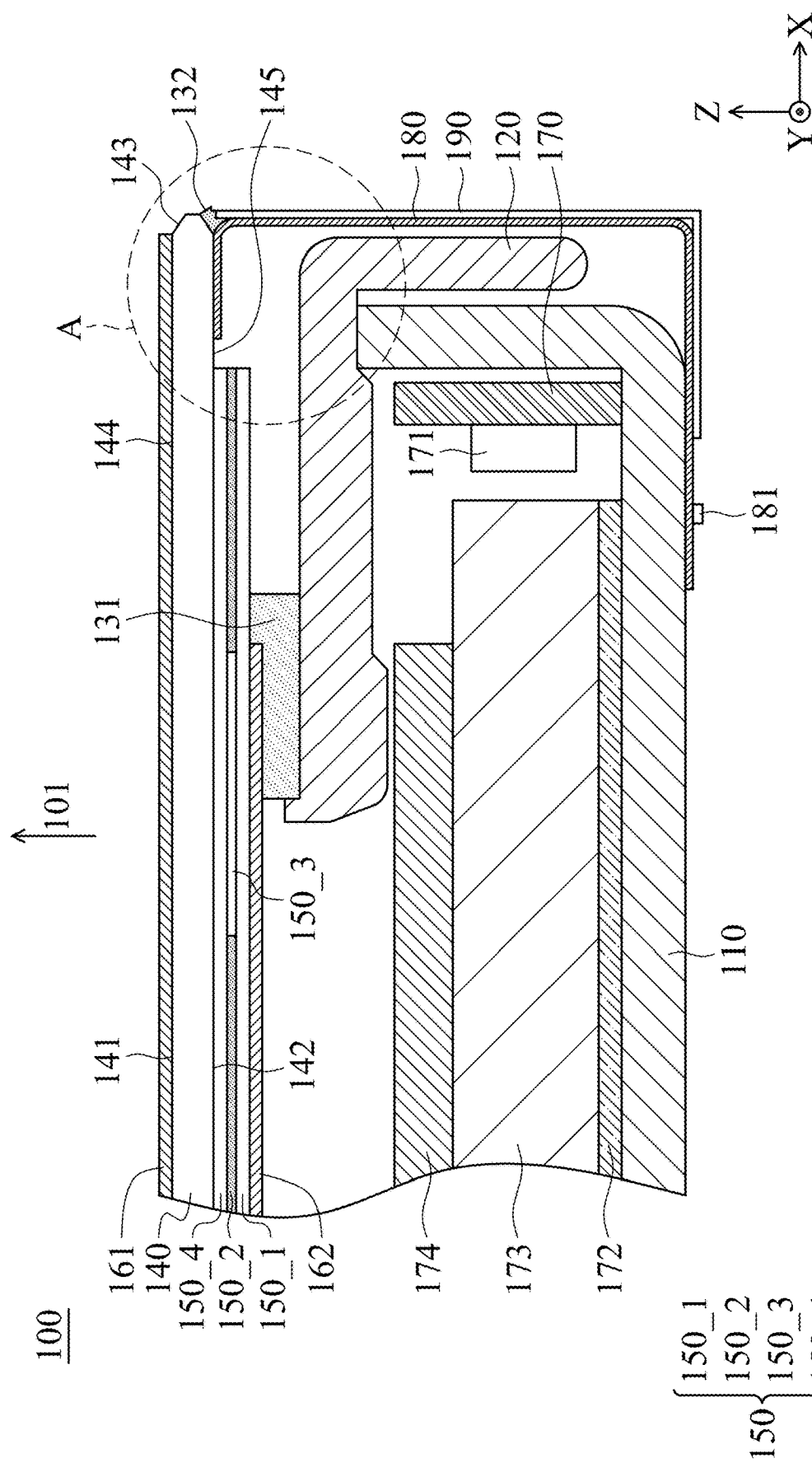
FIG. 2 is a cross-sectional view illustrating along line C-C shown in FIG. 1.

FIG. 2 is a cross-sectional view illustrating along line C-C shown in FIG. 1. As shown in FIG. 2, the display device 100 further includes a second substrate 150 that is disposed on the frame 120. The metal element 110 may be configured to support the frame 120, and the frame 120 may be configured to support the first substrate 140 and the second substrate 150. In the present embodiment, the first substrate 140 and the second substrate 150 have a normal direction, which is parallel to the Z direction. The X direction and the Y direction are perpendicular to the normal direction of the first substrate 140 and the second substrate 150. In addition, the display device 100 has a display side 101, wherein the light of the display device 100 may be emitted through the display side 101, that is, users may observe the light emitted by the display device 100 or the display screen on the display side 101. In the present embodiment, the metal element 110 is disposed opposite the display side 101 of the display device 100, but it is not limited thereto.

For example, the material of the metal element 110 may include metal, any other suitable conductive material, or a combination thereof, but is not limited thereto. In addition, a circuit board 170, a light-emitting element 171, a reflective sheet 172, a light guide plate 173 and/or an optical film 174 may be optionally disposed on the metal element 110. The light-emitting element 171 may be disposed on the circuit board 170 and electrically connected to the circuit board 170. As such, a backlight source may be provided. The light guide plate 173 may be disposed on the reflective sheet 172, and the optical film 174 may be disposed on the light guide plate 173. The light emitted by the light-emitting element 171 may irradiate to the display side 101 of the display device 100 through the reflective sheet 172, the light guide plate 173, and the optical film 174. In the present embodiment, the light-emitting element 171 is disposed beside the light guide plate 173. Namely, viewed from a direction that is perpendicular to the display side 101 (the Z direction), the light-emitting element 171 may not be overlapped with the light guide plate 173. In detail, in the present embodiment the display device 100 includes an edge-type backlight structure, but the present disclosure is not limited thereto. In other embodiments, the display device 100 may also be a direct-type backlight structure. For example, in this cross-sectional view, the reflective sheet 172 may be disposed between the light-emitting element 171 and the circuit board 170, but the present disclosure is not limited thereto. In addition, although in the present embodiment, the optical film 174 is illustrated as a single-layer structure, it is not limited thereto. In other embodiments, the optical film 174 may include a multilayer structure. For example, the optical film 174 may include a diffusion sheet, a prism sheet, and/or a brightness enhancement film, but is not limited thereto.

For example, the first substrate 140 may be a thin-film transistor (TFT) substrate, which may be a flexible substrate or an inflexible substrate. The material of the first substrate 140 may include, for example, glass, sapphire, ceramics, polyimine (PI), polyethylene terephthalate (PET), polycarbonate (PC), polyether oxime (PES), polybutylene terephthalate (PBT), polynaphthalene ethylene glycolate (PEN), polyarylate (PAR), other suitable materials, or a combination thereof, but it is not limited thereto. The first substrate 140 has a first surface 141, a second surface 142 and a side surface 143, wherein the side surface 143 connects two opposite first surface 141 and second surface 142. In the present embodiment, the first surface 141 faces the display side 101 of the display device 100, that is, the first surface 141 is closer to the display side 101 than the second surface 142. In other words, the first surface 141 may comprise a light-emitting area 144, which the light is emitted through, and the second surface 142 may comprise another area 145. As shown in FIG. 2, the another area 145 is disposed opposite to the light-emitting area 144 and located between the light-emitting area 144 and the frame 120. The first substrate 140 may include a pixel array or a light-emitting diode, but the present disclosure is not limited thereto.

In the present embodiment, the second substrate 150 may be a filter substrate, but is not limited thereto. In some embodiments, the second substrate 150 may be a composite structure containing a base layer 150_1, a light shielding layer 150_2 disposed on the base layer 150_1, a color filter layer 150_3, and/or a light conversion layer 150_4 (e.g. quantum dot material). In other embodiments, the second substrate 150 may be a package layer to avoid water vapor erosion, so that the display quality of the display device 100 may be improved, and/or the reliability of the display device 100 may be improved. It should be understood that, in some embodiments, a liquid crystal layer (not shown) may be disposed between the first substrate 140 and the second substrate 150. In some embodiments, the aforementioned liquid crystal layer may include nematic liquid crystal, smectic liquid crystal, cholesteric liquid crystal, blue phase liquid crystal, or any other suitable liquid crystal material. In the present embodiment, the second surface 142 of the first substrate 140 is between the first surface 141 of the first substrate 140 and the second substrate 150.

In addition, an upper polarizing film 161 may be disposed on the first substrate 140, and a lower polarizing film 162 may be disposed on the second substrate 150. That is, the first substrate 140 and the second substrate 150 are located between the upper polarizing film 161 and the lower polarizing film 162, and the second substrate 150 is disposed between the lower polarizing film 162 and the first substrate 140. In the present embodiment, the lower polarizing film 162 may be disposed above the frame 120. In the present embodiment, the area of the first substrate 140 is greater than the area of the second substrate 150, but it is not limited thereto. In some embodiments, the area of the second substrate 150 may be greater than the area of the lower polarizing film 162, and the area of the first substrate 140 may be greater than the area of the upper polarizing film 161, but the present disclosure is not limited thereto. In some embodiments, the upper polarizing film 161 may almost cover the first surface 141 of the first substrate 140 until the side surface 143. It should be noted that the areas of the first substrate 140, the second substrate 150, the upper polarizing film 161, and the lower polarizing film 162 are, for example, the maximum area measured along a plane that is parallel to the display side 101 (for example, the X-Y plane), or the maximum area measured in the top view direction (for example, in the Z direction). It should be understood that although the upper polarizing film 161 and the lower polarizing film 162 are both shown in the present embodiment, those skilled in the art should be able to adjust the number and the position of upper polarizing film 161 and lower polarizing film 162 as required. In some embodiments, a plurality of upper polarizing film 161 and/or a plurality of lower polarizing film 162 may be provided. In some embodiments, the upper polarizing film 161 and/or the lower polarizing film 162 may be omitted.

As shown in FIG. 2, an adhesive material 131 may be disposed on the frame 120 to adhere the second substrate 150 and the frame 120. In some embodiments, a portion of the lower polarizing film 162 may be disposed between the adhesive material 131 and the second substrate 150 to achieve a good adhesion, but it is not limited thereto. In some embodiments, the upper surface of the adhesive material 131 may contact the second substrate 150 and the lower polarizing film 162, but it is not limited thereto.

In addition, the display device 100 further includes a flexible film 180 and a conductive structure 190. A portion of the metal element 110 may be disposed between the first substrate 140 and a portion of the flexible film 180, and the flexible film 180 is disposed on the second surface 142 of the first substrate 140. The flexible film 180 may be bent toward the second substrate 150, or may be bent toward the opposite side of the display side 101. The conductive structure 190 may be disposed on the flexible film 180. In some embodiments, the conductive structure 190 may be disposed on the outer surface of the flexible film 180, that is, at least a portion of the flexible film 180 is disposed between the conductive structure 190 and the frame 120. In this embodiment, for example, the flexible film 180 may be a chip-on-film (COF) or any other component that may be used to transmit electrical signals, but is not limited thereto. In the present disclosure, the first substrate 140 provided with the flexible film 180 is disposed closer to the viewer, and the flexible film 180 is disposed on the second surface 142 of the first substrate 140. As such, the upper polarizing film 161 may almost cover the first surface 141 of the first substrate 140. The above design may achieve the effect of almost no frame or narrow frame, making the display device 100 more aesthetic.

The conductive structure 190 is electrically connected to the metal element 110. In some embodiments, the conductive structure 190 may directly contact the metal element 110, but is not limited thereto. In other words, the conductive structure 190 and the metal element 110 may form a conductive path, thereby effectively grounding external static electricity through the aforementioned conductive path. Therefore, the probability of electrostatic damage may be effectively reduced. In addition, in some embodiments, the display device 100 may be provided with a plurality of conductive structures 190 which are electrically connected to the metal element 110. The arrangement of the plurality of conductive structures 190 may effectively shorten the average conductive path, thereby obtaining a better grounding effect.

Figure 3:
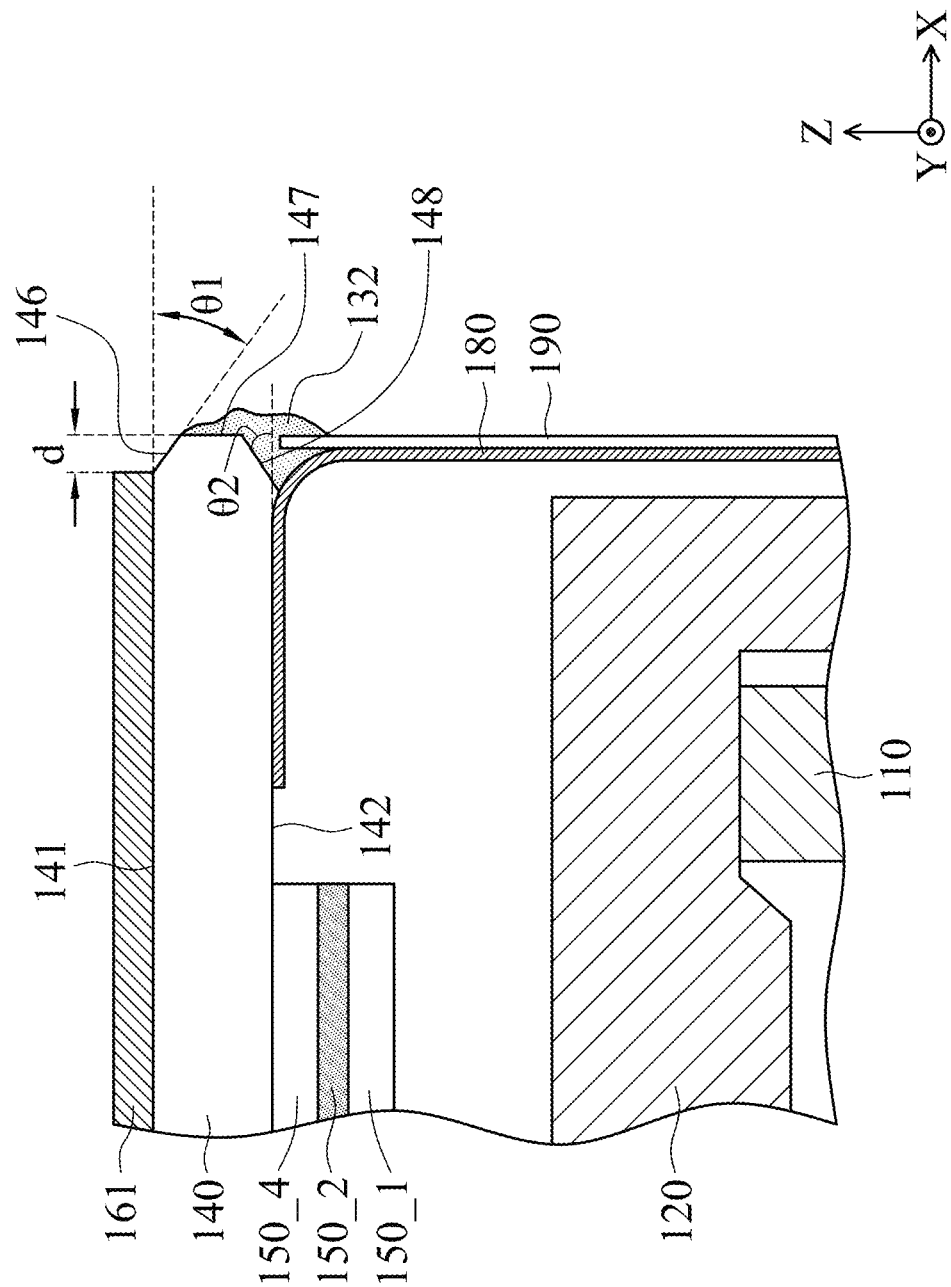
FIG. 3 is a partial enlarged view illustrating region A shown in FIG. 2.

FIG. 3 is a partial enlarged view along the region A shown in FIG. 2. As shown in FIG. 3, the side surface 143 of the first substrate 140 includes a first portion 146, a second portion 147 and a third portion 148, wherein the second portion 147 is located between the first portion 146 and the third portion 148. In the present embodiment, at least one of the first portion 146 and the third portion 148 is a chamfered structure, and the second portion 147 is a plane that is parallel to the Y-Z plane and connects the chamfered structures. For example, when viewed from the display side 101 of the display device 100 (i.e. along the Z direction), the chamfered structures of the first portion 146 and the third portion 148 may be inclined planes, but are not limited thereto. As shown in FIG. 3, the second portion 147 is substantially perpendicular to the first surface 141 and/or the second surface 142, while the first portion 146 and the third portion 148 are not perpendicular to the first surface 141 and/or the second surface 142. In other words, a portion of the side surface 143 in the present embodiment may not be perpendicular to the first surface 141 and/or the second surface 142. Namely, the first portion 146 and the third portion 148 are not parallel to the second portion 147. Please continue referring to FIG. 3, a first included angle θ1 is formed between the first portion 146 of the side surface 143 and an extension line of the first surface 141, wherein the first included angle θ1 may be in a range from about 15° to about 45° (15°≤θ≤145°). In some embodiments, the first included angle θ1 may be in a range from about 20° to about 40° (20°≤θ≤140°), but is not limited thereto. Similarly, a second included angle θ2 is formed between the third portion 148 of the side surface 143 and an extension line of the second surface 142. In some embodiments, the second included angle θ2 may be in a range from about 15° to about 45° (15°≤θ2≤45°). In some embodiments, the second included angle θ2 may be in a range from about 20° to about 40° (20°≤θ2≤40°), but is not limited thereto.

In some embodiments, in the X direction, the maximum distance d between the second portion 147 and the edge, which is closest to the second portion 147, of the upper polarizing film 161 (that is, the maximum width of the first portion 146 in the X direction) may be in a range from about 0.05 mm to about 0.3 mm (0.05 mm≤d≤0.3 mm), but not limited thereto. In some embodiments, the maximum distance d between the second portion 147 and the edge, which is closest to the second portion 147, of the upper polarizing film 161 in the X direction may be in the range of about 0.15 mm to about 0.2 mm (0.15 mm≤d≤0.2 mm), but not limited thereto. Arranging the first portion 146 as a chamfered structure may make the display device 100 more aesthetic, or the first substrate 140 may be less likely to scratch users or other components. It should be understood that, in other embodiments, the first portion 146 and the third portion 148 may be disposed as a curved surface, a rounded corner structure, or any other suitable structure to be aesthetic or less likely damaged.

In addition, in some embodiments, the first portion 146 and the third portion 148 may be formed by physical processing (such as diamond cutting wheel, laser light cutting or mechanical grinding), so the roughness of the first portion 146 and the roughness of the third portion 148 may be different, and the roughness of the first portion 146 and the third portion 148 may be different from the roughness of the second portion 147.

Furthermore, the display device 100 may further include a adhesive material 132 that may be filled in the gap between the third portion 148 and the flexible film 180. Since the third portion 148 is disposed as a chamfered structure, the contact area between the adhesive material 132 and the first substrate 140 may be increased, and the adhesive force of the adhesive material 132 may be improved. In some embodiments, the adhesive material 132 may extend onto the second portion 147, that is, the adhesive material 132 may contact the second portion 147 and the third portion 148. In some embodiments, the adhesive material 132 may further extend to the second surface 142 of the first substrate 140 and contact at least a portion of the second surface 142 and at least a portion of the flexible film 180. In some embodiments, one end of the conductive structure 190 may be covered by the adhesive material 132. The arrangement of the adhesive material 132 may adhere various components of the display device 100, thereby improving the structural strength of the display device 100. For example, the material of the adhesive material 132 may include glue, ultraviolet curing glue, other suitable adhesive materials, or a combination thereof, but is not limited thereto. In other embodiments, the adhesive material 132 may not contact the first portion 146.

In some embodiments, the assembly process of the display device 100 includes adhering the flexible film 180 to the first substrate 140, and filling the adhesive material 132 between the flexible film 180 and the first substrate 140. Then, the first substrate 140 (and the second substrate 150) is adhered to the frame 120 (for example, via the adhesive material 131), and the conductive structure 190 is disposed on the flexible film 180 and contacts the metal element 110. Finally, a protective casing may be optionally disposed on the outside of the display device 100, wherein the aforementioned casing may be made of metal or any other suitable material, but is not limited thereto. It should be understood that the assembly process of the display device 100 is merely taken as an example, and those skilled in the art may adjust the above-mentioned assembly process as required, and the detailed description will not be provided below.

Figure 4:
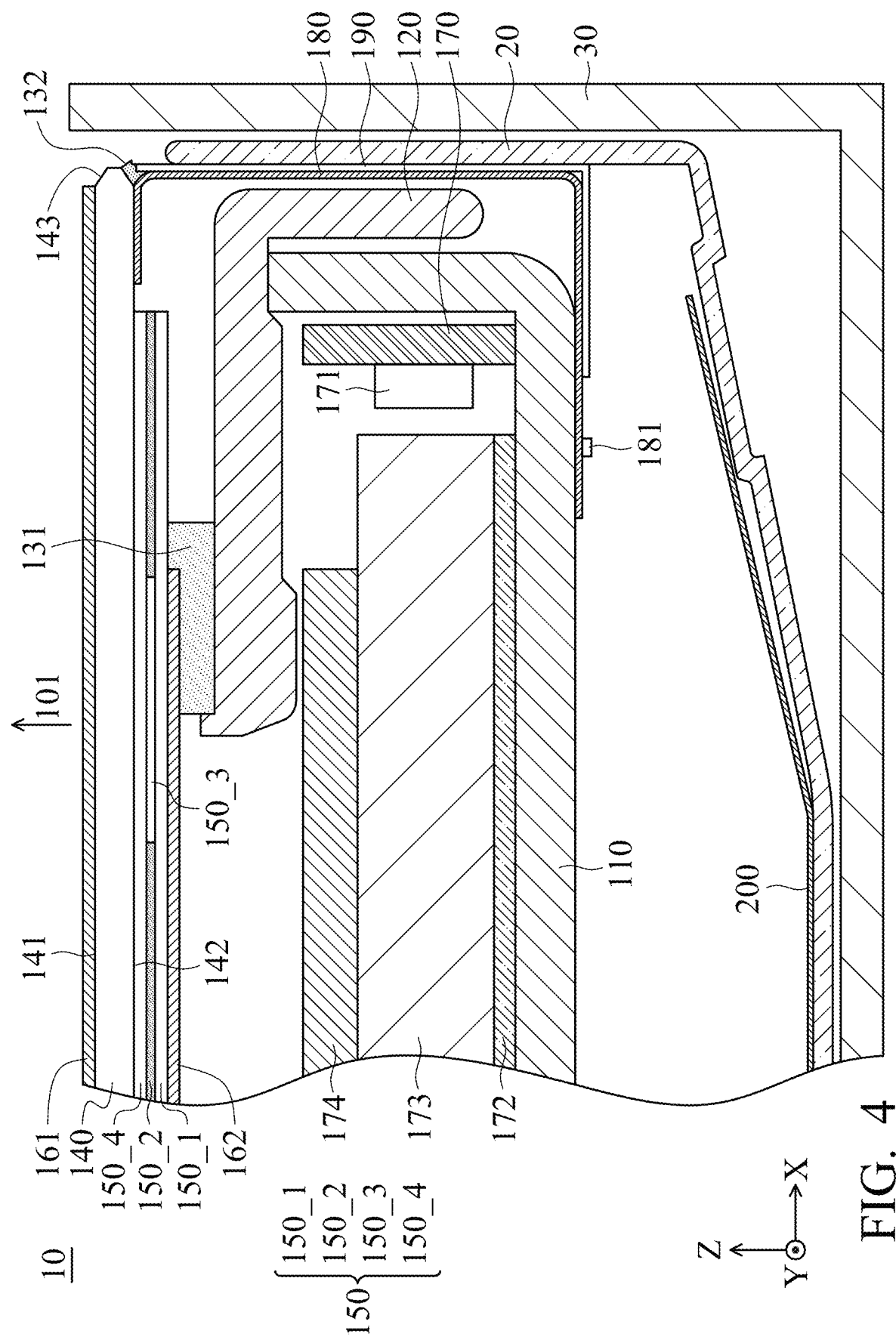
FIG. 4 is a cross-sectional view illustrating a display module in accordance with some embodiments of the present disclosure.

FIG. 4 is a cross-sectional view illustrating the display module 10 in accordance with an embodiment of the present disclosure. As shown in FIG. 4, the display module 10 may include a display device (for example, the display device 100 shown in FIG. 2), an outer frame 20 and a housing 30 disposed outside the display device. For example, the material of the outer frame 20 and the housing 30 may include metal, plastic, other suitable materials, or a combination thereof, but is not limited thereto. The arrangement of the outer frame 20 and the housing 30 may protect the components of the internal display device, reducing the impact from the outside. In some embodiments, viewed from a direction that is perpendicular to the display side 101, a portion of the outer frame 20 may not overlap with the first substrate 140, but it is not limited thereto. In some embodiments, an insulating material 200 is disposed on the outer frame 20. For example, the material of the insulating material 200 includes MYLAR, other suitable materials, or a combination thereof, but is not limited thereto. The insulating material 200 may ensure the insulation between the outer frame 20 and the metal element 110.

In addition, in some embodiments, a gap may be left between the conductive structure 190 and the outer frame 20 and/or between the outer frame 20 and the housing 30, so that the tolerances between each component may be dealt with in time, improving the assembly yield, but the present disclosure is not limited thereto. In some embodiments, the conductive structure 190 and the outer frame 20 may directly contact, and/or the outer frame and the housing 30 may also directly contact, so as to reduce the size of the display module 10.

As set forth above, the embodiments of the present disclosure provide a display device with a chamfered structure formed on the edge of the substrate. The arrangement of the chamfered structure may make the display device more aesthetic, or the display device is less likely to scratch users. In addition, in the embodiment of the present disclosure, the substrate provided with the flexible film is disposed closer to the viewer, and the polarizing film may be almost spread across one surface of the substrate, thereby achieving the effect of almost no frame or narrow frame and improving the appearance of the display device. In addition, the display device in the embodiment of the present disclosure is further provided with a conductive structure that contacts a metal element (such as a back plate), which may effectively reduce the probability of electrostatic damage.

While the embodiments and the advantages of the present disclosure have been described above, it should be understood that those skilled in the art may make various changes, substitutions, and alterations to the present disclosure without departing from the spirit and scope of the present disclosure. It should be noted that different embodiments in the present disclosure may be arbitrarily combined as other embodiments as long as the combination conforms to the spirit of the present disclosure. In addition, the scope of the present disclosure is not limited to the processes, machines, manufacture, composition, devices, methods and steps in the specific embodiments described in the specification. Those skilled in the art may understand existing or developing processes, machines, manufacture, compositions, devices, methods and steps from some embodiments of the present disclosure. Therefore, the scope of the present disclosure includes the aforementioned processes, machines, manufacture, composition, devices, methods, and steps. Furthermore, each of the appended claims constructs an individual embodiment, and the scope of the present disclosure also includes every combination of the appended claims and embodiments.

What is claimed is:

1. A bendable device, comprising:
   a frame;
   a base layer disposed on the frame;
   a light shielding layer disposed on the base layer;
   a flexible substrate disposed on the base layer and comprising:
   a plurality of transistors;
   a light-emitting area, wherein the bendable device emits a light through the light-emitting area; and
   an another area disposed opposite to the light-emitting area and between the light-emitting area and the frame;
   a flexible film comprising a first portion and a second portion, wherein the flexible film is electronically connected to the flexible substrate through the first portion, the first portion of the flexible film is disposed between the another area and the frame, and the second portion of the flexible film is disposed under the frame; and
   a first adhesive material, wherein the first adhesive material connects at least a portion of the flexible film and at least a portion of the flexible substrate.

2. The bendable device as claimed in claim 1, wherein the flexible film is electrically connected to the flexible substrate.

3. The bendable device as claimed in claim 1, wherein the bendable device has a light-emitting side, the flexible film has a bend, and the bend is toward one side opposite to the light-emitting side.

4. The bendable device as claimed in claim 1, wherein at least another portion of the flexible substrate is disposed parallel to the light shielding layer.

5. The bendable device as claimed in claim 4, further comprising an insulating layer, wherein at least a portion of the frame is sandwiched between the insulating layer and the light shielding layer.

6. The bendable device as claimed in claim 1, wherein in a cross section view, at least the portion of the flexible substrate protrudes from the light shielding layer.

7. The bendable device as claimed in claim 6, wherein at least the portion of the flexible substrate is electrically contacted the flexible film.

8. The bendable device as claimed in claim 1, wherein a projection of the light shielding layer on the flexible substrate is separated from a projection of the first adhesive material on the flexible substrate.

* * * * *